(12) United States Patent
Ciarnella et al.

(10) Patent No.: US 12,454,110 B2
(45) Date of Patent: Oct. 28, 2025

(54) METHOD AND SYSTEM FOR CLEANING AN INNER SURFACE OF A TIRE

(71) Applicant: Bridgestone Europe NV/SA, Zaventem (BE)

(72) Inventors: Alessio Ciarnella, Rome (IT); Paolo Straffi, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 206 days.

(21) Appl. No.: 18/286,833

(22) PCT Filed: Apr. 26, 2022

(86) PCT No.: PCT/EP2022/061058
§ 371 (c)(1),
(2) Date: Oct. 13, 2023

(87) PCT Pub. No.: WO2022/229190
PCT Pub. Date: Nov. 3, 2022

(65) Prior Publication Data
US 2024/0190092 A1    Jun. 13, 2024

(30) Foreign Application Priority Data
Apr. 27, 2021  (IT) .................. 102021000010571

(51) Int. Cl.
*B29D 30/00* (2006.01)
*B29D 30/06* (2006.01)

(52) U.S. Cl.
CPC .. *B29D 30/0005* (2013.01); *B29D 2030/0011* (2013.01); *B29D 2030/0682* (2013.01); *B29D 30/0685* (2013.01); *B29D 2030/0686* (2013.01)

(58) Field of Classification Search
CPC ............ B29D 30/0005; B29D 30/0685; B29D 2030/0011; B29D 2030/0682; B29D 2030/0686; B29D 30/0681; B08B 7/0042
See application file for complete search history.

(56) References Cited

U.S. PATENT DOCUMENTS

| 6,369,353 B1 * | 4/2002 | Soska ..................... B29C 33/72 |
| | | 219/121.68 |
| 2012/0095587 A1 * | 4/2012 | Hair, Jr. ........... G05B 19/41875 |
| | | 700/110 |

(Continued)

FOREIGN PATENT DOCUMENTS

| EP | 3175974 A1 | 6/2017 |
| EP | 3175975 A1 | 6/2017 |

(Continued)

OTHER PUBLICATIONS

International Search Report, corresponding application No. PCT/EP2022/061058, Sep. 9, 2022, 2 pages.

*Primary Examiner* — Christopher W Raimund
(74) *Attorney, Agent, or Firm* — Patterson Intellectual Property Law, PC (57) ABSTRACT

A method and system for cleaning the inner surface of a tire, comprising the steps of: emitting a laser beam that is directed against the inner surface using at least an emitter device; performing deeper cleaning within at least a first annular zone of the inner surface in applying, using at least the laser beam, to the first annular zone a first surface energy density; and performing less thorough cleaning within at least a second annular zone of the inner surface by applying, using at least the laser beam to the second annular zone a second surface energy density that is lower than the first surface energy density.

20 Claims, 6 Drawing Sheets

(56) References Cited

U.S. PATENT DOCUMENTS

| | | | |
|---|---|---|---|
| 2017/0151737 A1* | 6/2017 | Helfen | B60C 5/14 |
| 2019/0248084 A1 | 8/2019 | Straitiff et al. | |
| 2020/0298515 A1* | 9/2020 | Nishida | B29D 30/0061 |

FOREIGN PATENT DOCUMENTS

| | | | | |
|---|---|---|---|---|
| EP | 3281810 A1 | 2/2018 | | |
| EP | 3677416 A1 | 7/2020 | | |
| WO | 2017082162 A1 | 5/2017 | | |
| WO | WO-2019116645 A1 * | 6/2019 | | B60C 23/0493 |

* cited by examiner

METHOD AND SYSTEM FOR CLEANING AN INNER SURFACE OF A TIRE

TECHNICAL SECTOR

The present invention relates to a method and to a system for cleaning an inner surface of a tire.

PRIOR ART

In recent years tire development has been directed towards tires with an inner lining that is manufactured with a sealing agent that is intended to seal any punctures. Normally, in order to ensure both a sealing action in relation to any holes and the stability thereof within the inner cavity regardless of the conditions of the tire, the sealing agent has a high level of viscosity. The sealing agent is applied to the inner surface (namely above the innerliner) of a pre-vulcanised tire at the area of the tire that comes into contact with the road (namely the area of the tire wherein punctures can potentially occur). In particular, the sealing agent is applied at the tread and partially at the sidewalls.

In recent years the development of tires has also been directed towards tires that are internally provided with a sound-absorbing material (generally a sponge) for reducing the noise generated by a tire rolling on a road surface. The sound-absorbing material is applied to the inner surface (namely above the innerliner) of an already vulcanised tire and in particular it is glued to the inner surface of the tire at the tread (namely at the area of the tire that comes into contact with the road) and possibly also at part of the side walls.

Before applying a sealing agent or a sound-absorbing material to the inner surface (consisting of the innerliner) of a tire and in order to ensure optimal adhesion of the sealing agent or sound-absorbing material to the inner surface, it is necessary to clean the inner surface in order to eliminate any dirt and processing residues (for example residues from the releasing agent applied to the inner walls of the vulcanization mold).

The patent applications WO2017082162A1 and EP3281810A1 describe a system for cleaning an inner surface of a tire wherein a laser emitter is inserted into the already vulcanised tire which emits a laser beam that is directed against the inner surface of the tire whilst the tire is being made to turn upon itself at a constant speed; the laser emitter is progressively translated axially (i.e., along the central axis of rotation of the tire) in such a way that the laser beam travels through a spiral that sweeps the entire inner surface of the tire from start to finish.

The patent applications WO2017082162A1 and EP3281810A1 describe completely cleaning, and in the same way, the entire inner surface of the tire; in this manner however the cleaning cycle is rather long and therefore, in order to have an hourly productivity that is suitable for the requirements of a production plant, it is necessary to provide numerous cleaning stations, all of which operate in parallel, with an associated increase in costs and dimensions. To solve this problem (i.e., to render the cleaning cycle quicker), the patent applications EP3175974A1 and EP3175975A1 describe causing the laser beam that cleans the inner surface of the tire to follow a discontinuous and non-linear (i.e. wavy) path that cleans the inner surface of the tire in strips, i.e., alternating between evenly cleaned strips and completely uncleaned strips; this solution has drawbacks, however, in that it does not always make it possible to obtain optimal adhesion of the sealing agent or of the sound-absorbing material to the inner surface.

DESCRIPTION OF THE INVENTION

The object of the present invention is to provide a method and a system for cleaning an inner surface of a tire, which method and system for cleaning are free from the drawbacks described above and, in particular, make it possible to quickly perform a cleaning cycle, ensuring, at the same time, optimal adhesion of the sealing agent or of the sound-absorbing material to the inner surface under all conditions.

According to the present invention, a method and a system are provided for cleaning the inner surface of a tire, according to that determined within the attached claims.

The claims describe preferred embodiments of the present invention forming an integral part of the present description.

BRIEF DESCRIPTION OF THE DRAWINGS

The present invention will now be described with reference to the attached drawings, which illustrate an exemplary, non-limiting embodiment, wherein.

PREFERRED EMBODIMENTS OF THE INVENTION

Figure 1:
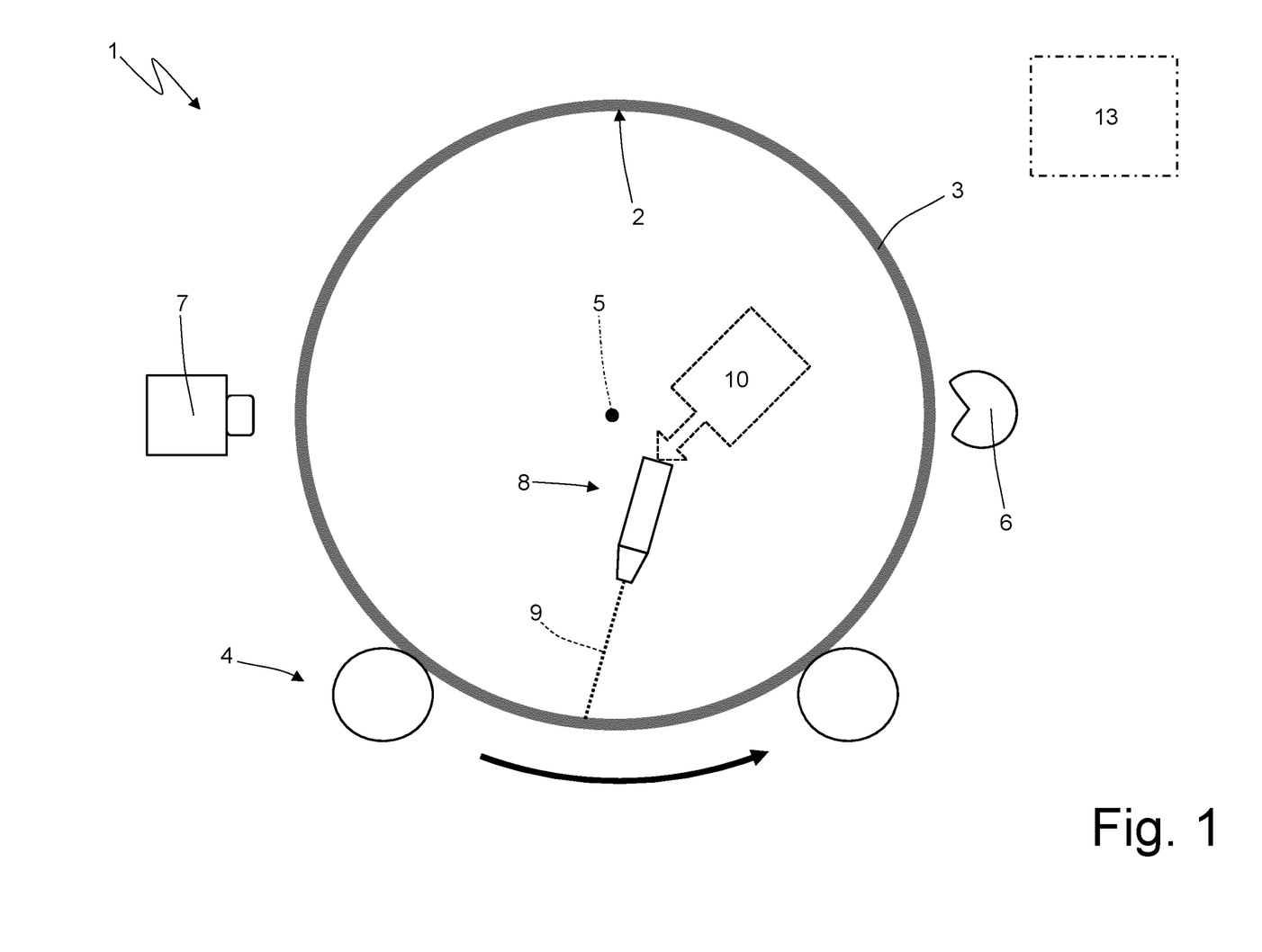
FIG. 1 is a schematic side view, with parts removed for clarity, of a cleaning system manufactured in accordance with the present invention.
Figure 2:
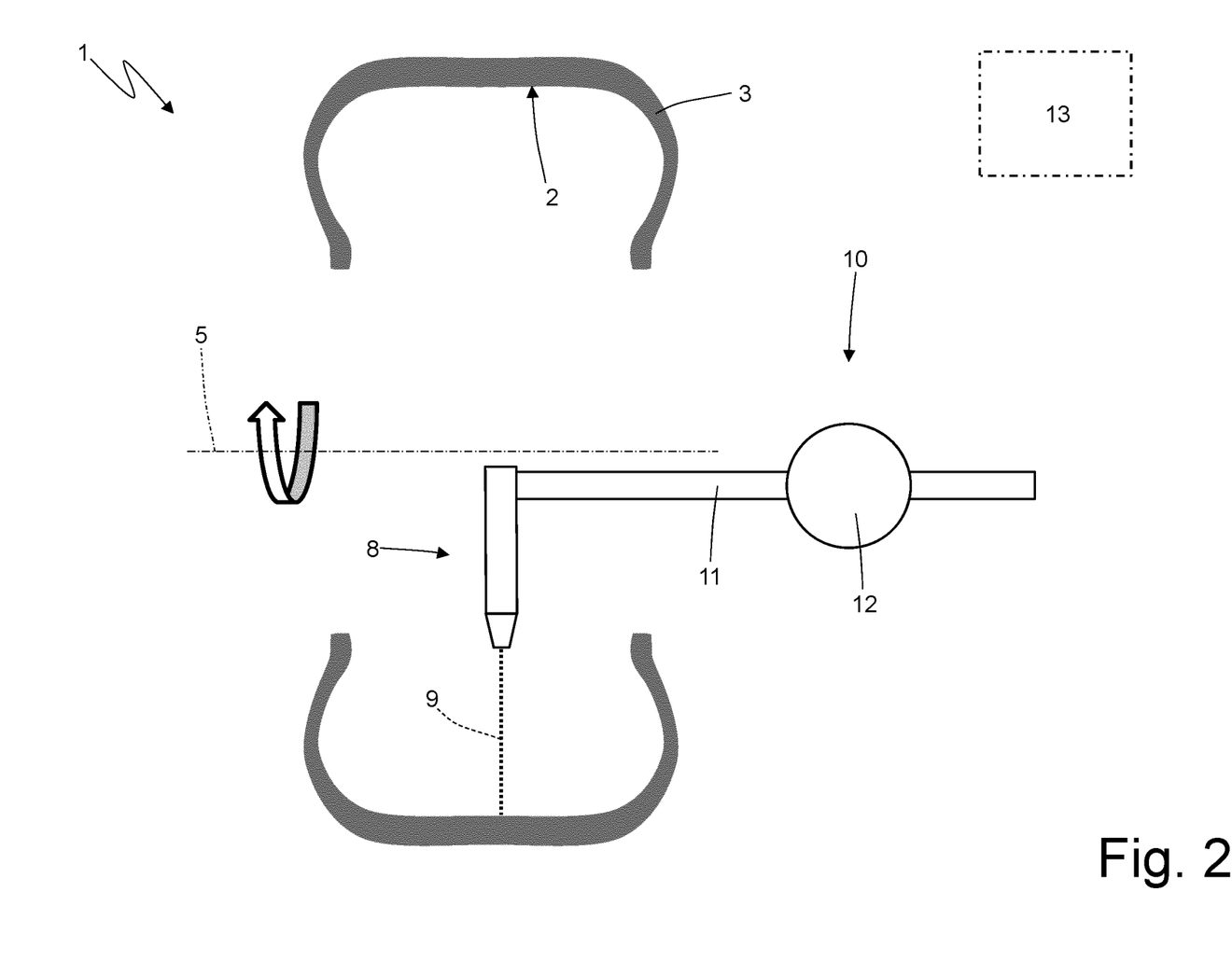
FIG. 2 is a schematic front view, with parts removed for clarity, of the cleaning system of FIG. 1.

In FIGS. 1 and 2, the number 1 indicates, in the entirety thereof, a cleaning system 1 for cleaning (at least) part of the inner surface 2 (consisting of the innerliner) of a tire 3 before the application of a sealing agent or of a sound-absorbing material. In other words, the tire 3 has a toroidal shape that is delimited by an external surface and by the inner surface 2 opposite to the external surface, and the sealing agent or the sound-absorbing material are applied to (at least) part of the inner surface 2; before being able to apply the sealing agent or the sound-absorbing material to the inner surface 2 of the tire 3, it is necessary to clean the inner surface 2 in order to eliminate any dirt and processing residues (for example residues from the releasing agent applied to the inner walls of the vulcanization mold).

The cleaning system 1 comprises a support device 4 which is suitable for supporting the tire 3 arranged in a vertical position, and that is also suitable for bringing the tire 3 into rotation about an axis of rotation 5 that coincides with the central axis of symmetry. According to a preferred embodiment, the support device 4 comprises an expansion gripper which is mounted rotating and that is suitable for internally gripping the tire 3. Alternatively (as illustrated in the attached figures), the support device 4 comprises side rails (not illustrated) which hold the tire 3 stable in the vertical position and comprises motorised rollers (illustrated schematically) whereupon the tire 3 rests and is driven. According to a further embodiment, the support device 4 is shaped differently and is suitable for supporting the tire 3 which, rather than being arranged in a vertical position is instead arranged in a horizontal position.

The cleaning system 1 comprises a position sensor 6 which is suitable for determining the angular position of the tire 3 about the axis of rotation 5; the position sensor 6 may, for example, be an angular encoder coupled to one of the motorised rollers of the support device 4, or else the position sensor 6 may directly read the displacement of the tire 3.

The cleaning system 1 may comprise a camera 7 that faces the outer surface of the tire 3 at a side wall and that is suitable for reading a graphical identification code (typically a bar code or similar) which is applied to the same side wall; in the case of tires 4, the graphical identification code is always applied at the same position (also at the same angular position), and, therefore, when the camera 7 detects the presence of the graphical identification code, the corresponding angular position of the tire 3 around the axis of rotation 5 is contextually determined in order to obtain an absolute angular reference for the angular position of the tire 3 around the axis of rotation 5. The support device 4 comprises an angular position sensor (normally an encoder) that detects the angular position of the tire 2 whilst the tire 2 is rotated.

The cleaning system 1 includes an emitter device 8 that is capable of emitting a laser beam 9 that is powerful enough to sublimate (evaporate) at least part of the foreign material present upon the inner surface 2 (consisting of the inner-liner) of the tire 3; such foreign material may include releasing agents (applied within the vulcanization mold) that can inhibit subsequent production processes. By properly modulating the laser beam 9, it is possible to avoid any damage to the inner surface 2 (consisting of the innerliner) of the tire 3. The laser beam 9 is consequently capable of cleaning the inner surface 2 of the tire 3 without running the risk of damaging the inner surface 2 of the tire 3.

Furthermore, the cleaning system 1 comprises a handling device 10 that implements a relative movement between the emitter device 8 and the tire 2 carried by the support device 4 (whether moving the support device 4, that carries the tire 2 and holding stationary the emitter device 8 or else moving the emitter device 8 and holding stationary the support device 4 that carries the tire 2). At the beginning and at the end of the cleaning cycle, the handling device 10 positions the emitter device 8, respectively, inside the tire 3 and outside the tire 3, whilst during the cleaning cycle the movement device 10 moves the emitter device 8 axially (i.e., parallel to the axis of rotation 5) in relation to the tire 2 from one side of the tire 3 to the opposite side of the tire 3 in order to allow the laser beam 9, emitted by the emitter device 8, to clean the entire inner surface 2 of the tire 3.

According to that illustrated in FIG. 2, the handling device 10 can comprise a support arm 11, which at one end supports the emitter device 8 and an actuator 12, which axially translates the support arm 11 (i.e., parallel to the axis of rotation 5); according to an alternative embodiment, the handling device 10 can comprise a robotic arm having a greater number of degrees of freedom, as necessary, in order to initially insert the emitter device 8 into the tire and to subsequently remove the emitter device 8 from the tire.

According to a possible embodiment, the handling device 10 holds stationary the emitter device 8 during the cleaning of a circular strip (obviously having a width equal to the width, i.e., to the axial dimension of the laser beam 9) of the inner surface 2 and moves the emitter device 8 axially (by one step), only between the end of the cleaning of a circular strip of the inner surface 2 and the beginning of the cleaning of the next and adjacent circular strip of the inner surface 2; in other words, a plurality of circular strips of the inner surface 2, that are independent therebetween and arranged one next to the other, are cleaned (generally with a certain mutual overlap, i.e., a new circular strip is more or less superimposed onto the adjacent circular strip). According to an alternative embodiment, the movement device 10 axially and continuously moves the emitter device 8 in order to clean a single continuous strip (i.e., seamlessly) of the inner surface 2 having a spiral shape (also in this case, each loop of the spiral is more or less superimposed onto the previous spiral).

The cleaning system 1 comprises a control unit 13, which supervises the operation of the same cleaning system 1 and, amongst other things, controls the activation and deactivation of the emitter device 8, regulates the rotational speed imparted by the support device 4, and controls the axial translational movement imparted by the movement device 10.

In use, when a new tire 3 to be cleaned is mounted onto the support device 4, the handling device 10 is actuated such as to insert the emitter device 8 inside the tire 3 to be cleaned (or such as to arrange the tire 3 to be cleaned around the emitter device 8). At this point, the support device 4 rotates the tire 3 around the axis of rotation 5 and subsequently the emitter device 8 is activated such as to emit the laser beam 9, which is directed against the inner surface 2 of the tire 3; at the same time, the handling device 10 is actuated such as to produce a relatively slow axial translation between the emitter device 8 and the tire 2, in such a way that the laser beam 9 can clean the entire inner surface 2 of the tire 3 from one end to the other. At the end of the cleaning cycle, the emitter device 8 is deactivated and then the handling device 10 is actuated such as to extract the emitter device 8 from the tire 3 (or such as to remove the tire 3 from the emitter device 8) and thus allow the clean tire 3 to be removed from the support device 4 and to fit a new tire 3 to be cleaned to the support device 4, thereby initiating a new cleaning cycle.

Figure 3:
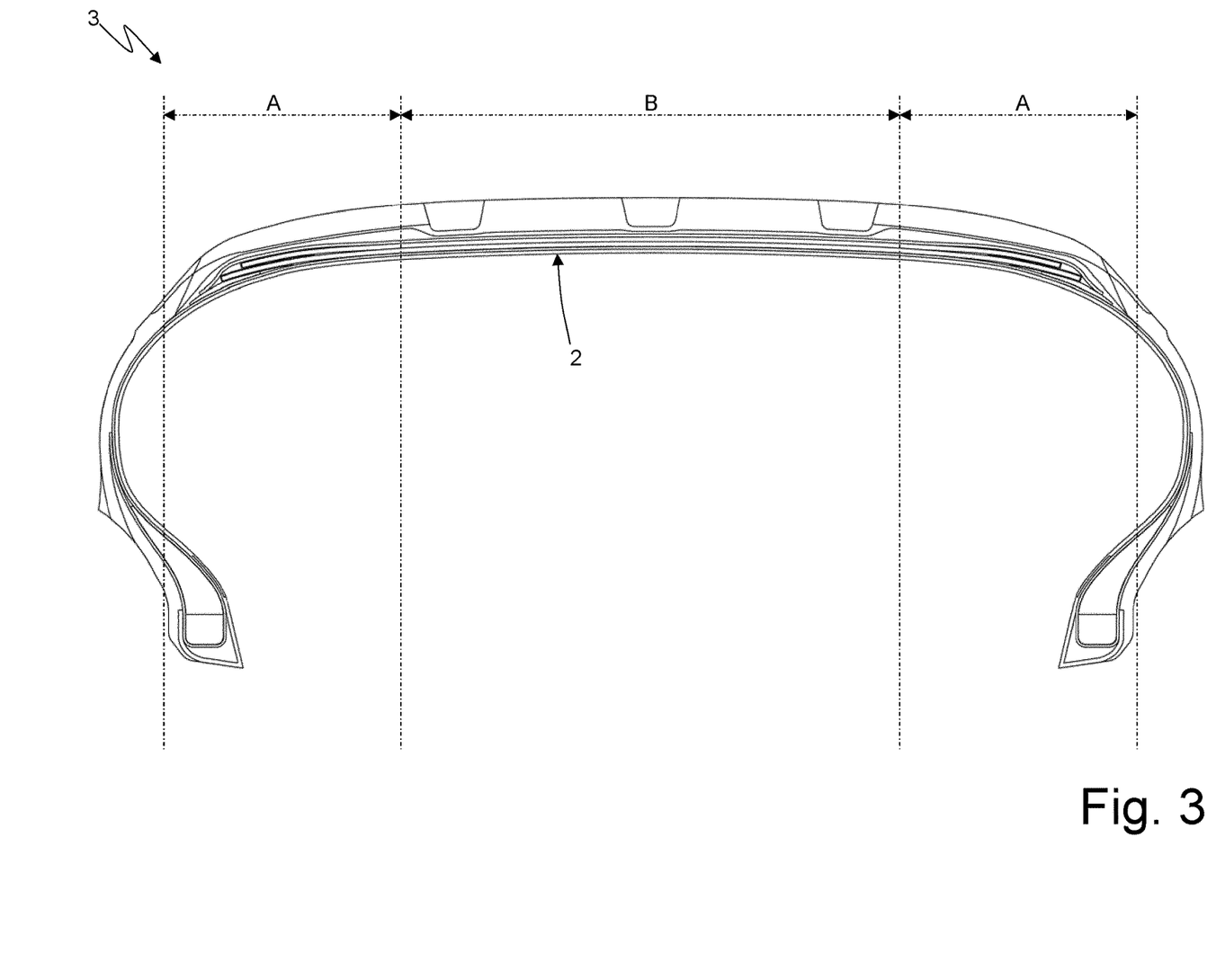
FIG. 3 is a schematic and cross-sectional view of part of a tire, highlighting the differentiated cleaning areas created by the cleaning system of FIG. 1.

With reference to that illustrated in FIG. 3, deeper cleaning is performed within (at least) an annular zone A (composed of a series of circular strips or spirals of a fixed width and adjacent therebetween and partially overlapping) of the inner surface 2 in applying, by means of the laser beam 9, to the annular zone A a first surface energy density (generally measured in Joules/cm$^2$); furthermore, less thorough cleaning is carried out within (at least) an annular zone B (also composed of a series of circular strips or spirals of a fixed width and adjacent therebetween and partially overlapping) of the inner surface 2 in applying, by means of the laser beam 9, to the annular zone B a second surface energy density that is lower than the first surface energy density. By way of example, the second surface energy density (applied to zone B) is between 35% and 50% of the first surface energy density (applied to zone A).

As illustrated in the attached figures, the annular zone A is arranged in proximity to the side walls of the tire 3 (i.e., at the outer edges of the tire 3) in such a way as to be arranged at the opposite ends of the annular zone B (i.e., the annular zone B is arranged inside the annular zone A, i.e., the annular zone B is surrounded on the right and on the left by the annular zone A).

Figure 4:
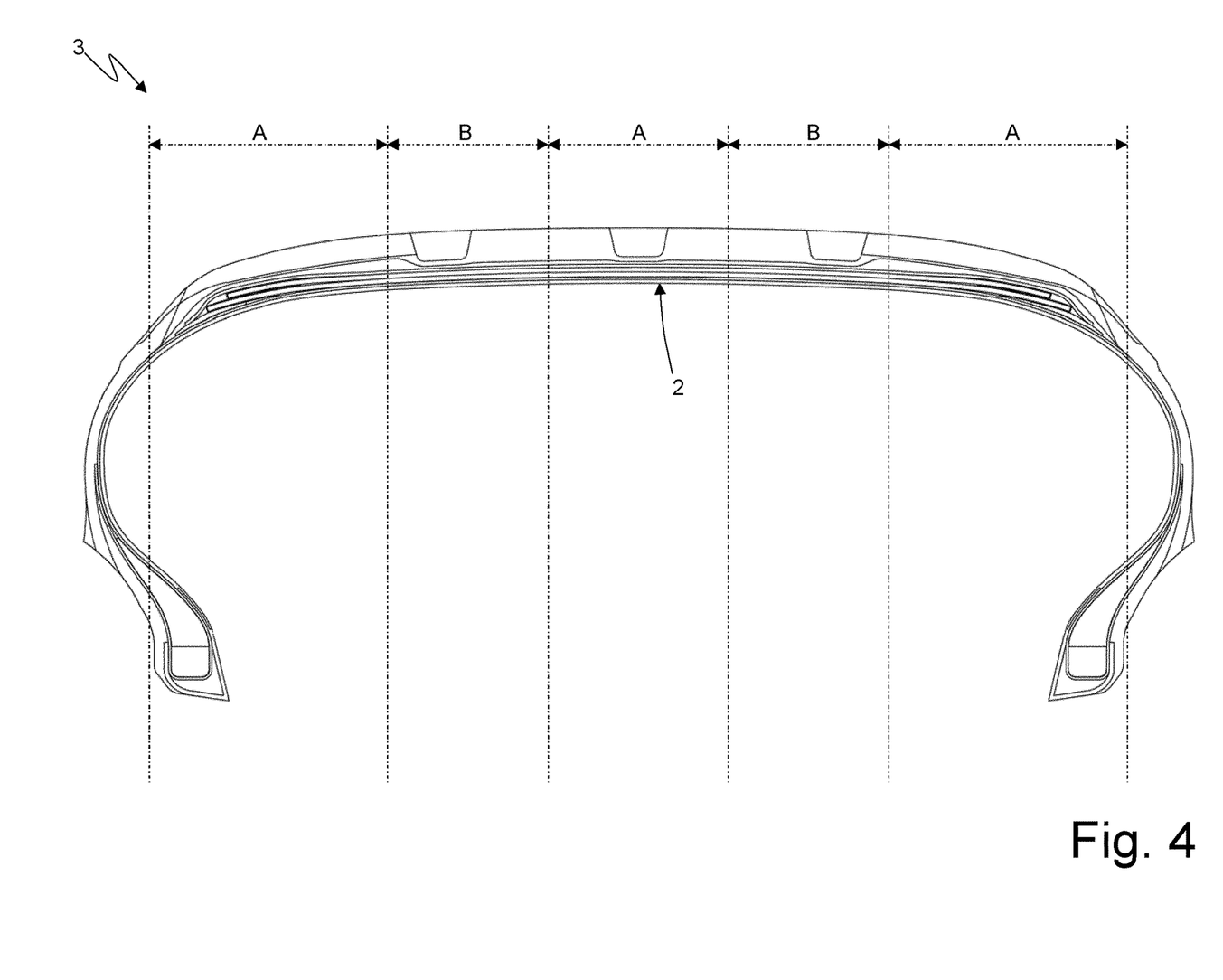
FIGS. 4, 5, and 6 show variations of the schematic view in FIG. 3.

In the embodiment illustrated in FIG. 3, the annular zone B is arranged at the centre of the tire 3, i.e., it entirely occupies the centre of the tire 3 and without interruption. In the alternative embodiment illustrated in FIG. 4, the annular zone A is arranged both in proximity to the side walls of the tire 3 and at the centre of the tire 3, and therefore zone B is located within two semi-central bands on opposite sides of the annular zone A which is arranged at the centre.

Figure 5:
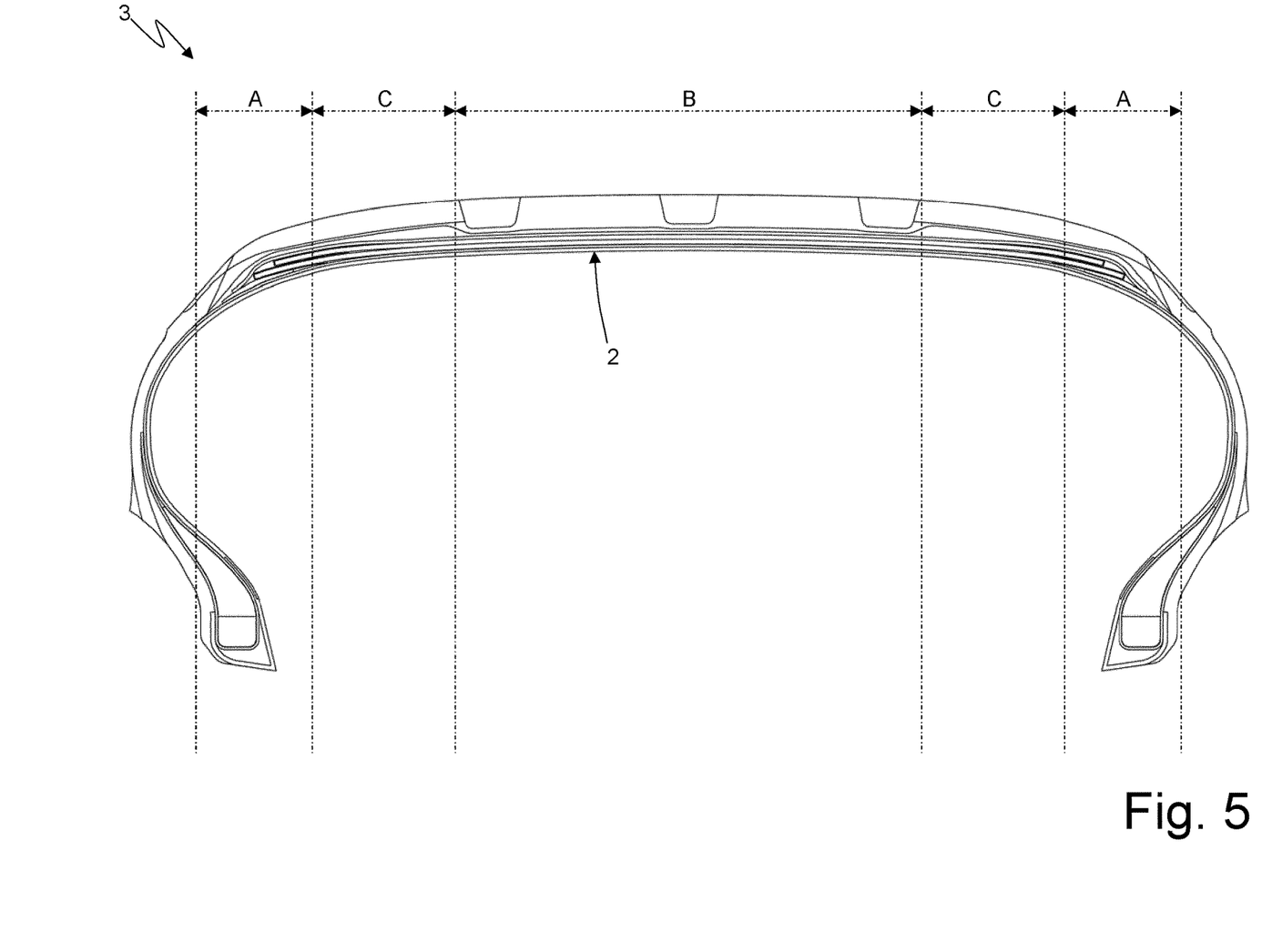
Figure 6:
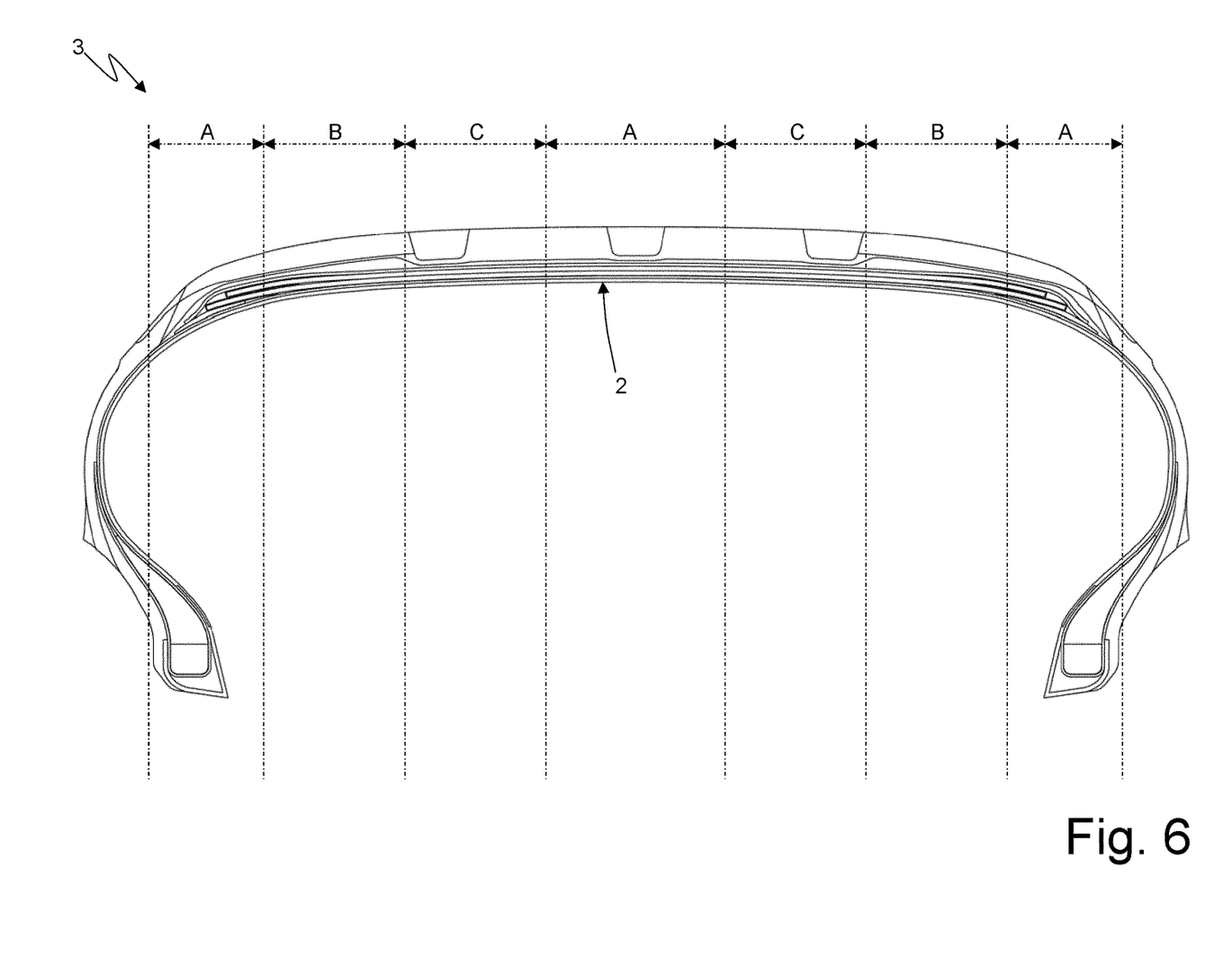

In the alternative embodiment illustrated in FIGS. 5 and 6, an intermediate cleaning cycle is performed within an annular zone C (composed of a series of circular strips or spirals of a fixed width and adjacent therebetween and partially overlapping) of the inner surface 2 in applying, by means of the laser beam 9, within the annular zone C a third surface energy density that is lower than the first surface energy density (applied within zone A) and higher than the second surface energy density (applied within zone B). By way of example, the second surface energy density (applied within zone C) is between 60% and 80% of the first surface energy density (applied to zone A). The annular zone C is interposed between the annular zone A and the annular zone B.

In the embodiments illustrated in the attached figures, two or three zones A, B and C are provided for, each having a differing degree of cleanliness (i.e., a different surface energy density applied by the laser beam 9); according to other embodiments, not illustrated, more than three (for example four, five, six . . . ) zones A, B and C may be provided for, each having a different degree of cleanliness (i.e., a different surface energy density as applied by the 9 laser beam).

According to a preferred embodiment, the intensity of the laser beam 9, as emitted by the emitter device 8, is always kept constant (i.e., the emitter device 8 is always operated at the rated power, i.e., at the maximum possible power, in such a way as to always exploit all of the potential of the emitter device 8) and therefore, in order to increase or decrease the surface energy density applied to the inner surface 2 by the laser beam 9, the rotational speed of the tire 3 about the axis of rotation 5 is decreased or increased.

In fact, with the same laser beam 9 intensity, as emitted by the emitter device 8, the faster the rotation of the tire 3 around the axis of rotation 5, the lesser the quantity of energy radiated onto the surface area (i.e., the surface energy density generally measured in Joules/cm$^2$).

According to a possible embodiment, one passage (circular strip or spiral) of the laser beam 9 is partially superimposed onto a subsequent passage (circular strip or spiral) of the laser beam 9, such that the laser beam 9 passes over (at least in part) where it has previously passed. In this case, it is possible to vary the degree of overlap between the various zones A, B and C; in particular, the annular zone A has a first degree of overlap which is greater than a second degree of overlap of the annular zone B, whilst annular zone C has a third degree of overlap between the first degree of overlap of annular zone A and the second degree of overlap of annular zone B. By way of example, the first degree of overlap of annular zone A is between 45% and 75%, the second degree of overlap of annular zone B is between 15% and 35%, and the third degree of overlap of annular zone C is between 30% and 50% (a degree of overlap of 0% corresponds to the absence of an overlap, whilst a degree of overlap of 100% corresponds to a total overlap); these values are only examples and could also be different.

It is important to underline that axially within annular zone A there are no parts of the inner surface 2 that are not cleaned, i.e., those parts of the inner surface 2 that are not cleaned are found only axially outside annular zone A. In other words, cleaning the inner surface 2 involves cleaning the entire inner surface 2 that is affected by the cleaning cycle in a differentiated way (i.e., with cleaner parts, zone A, and less clean parts, zone B) but in any case cleaning the entire area without leaving "holes" that are not clean at all.

According to a preferred embodiment, the emitter device 8 is actuated such as to continuously emit the laser beam 9 in order to achieve continuous cleaning, i.e., without interruptions, along circular bands. According to an alternative embodiment, the emitter device 8 is actuated such as to intermittently emit the laser beam 9 in order to perform intermittent cleaning ("checkerboard"), i.e., alternating clean areas with unclean areas, along circular bands.

The embodiments described herein can be combined therebetween without departing from the scope of protection of the present invention.

The cleaning system 1 described above has many advantages.

Firstly, the cleaning system 1 described above makes cleaning the inner surface 2 of the tire 3 very quick; some experimental tests have shown that the cleaning system 1 described above can even be 50-60% faster than a similar known cleaning system.

Furthermore, the cleaning system 1 described above ensures optimum adhesion of the sealing agent, or of the sound-absorbing material, to the inner surface 2.

Finally, the cleaning system 1 described above is simple and inexpensive to implement insofar as, when compared to a similar known cleaning system, it essentially requires only software updates without any hardware modification (or at least with marginal hardware modifications).

The invention claimed is:

1. A method for cleaning an inner surface of a tire, comprising:
   emitting a laser beam that is directed against the inner surface via at least an emitter device;
   performing a first cleaning within at least a first annular zone of the inner surface in applying, via at least the laser beam, to the first annular zone a first surface energy density; and
   performing a second cleaning within at least a second annular zone of the inner surface in applying, via at least the laser beam, to the second annular zone a second surface energy density that is not zero and that is lower than the first surface energy density,
   wherein a different respective surface energy density is applied via at least the laser beam to each of the first annular zone and the second annular zone.

2. The method of claim 1, wherein the second surface energy density is between 35% and 50% of the first surface energy density.

3. The method of claim 1, wherein the first annular zone is arranged in proximity to side walls of the tire and at opposite ends of the second annular zone.

4. The method of claim 1, wherein the second annular zone is arranged at a centre of the tire.

5. The method of claim 1, wherein the first annular zone is arranged both in proximity to side walls of the tire and at a centre of the tire.

6. The method of claim 1, further comprising performing an intermediate cleaning within at least a third annular zone of the inner surface in applying, via at least the laser beam, to the third annular zone a third surface energy density that is lower than the first surface energy density and higher than the second surface energy density.

7. The method of claim 6, wherein the third annular zone is interposed between the first annular zone and the second annular zone.

8. The method of claim 6, wherein the third surface energy density is between 60% and 80% of the first surface energy density.

9. The method of claim 1, further comprising:
   rotating, via at least a support device, the tire about an axis of rotation;

maintaining a constant intensity of the laser beam, as emitted by the emitter device; and increasing or decreasing the surface energy density applied to the inner surface by the laser beam in decreasing or increasing the rotational speed of the tire.

10. The method of claim 1, wherein, axially, any uncleaned parts of the inner surface are only found axially outside the first annular zone.

11. The method of claim 1, further comprising continuously emitting the laser beam to achieve uninterrupted cleaning along circular bands.

12. The method of claim 1, further comprising emitting the laser beam intermittently to alternate clean areas with non-clean areas along circular bands.

13. The method of claim 1, further comprising:
partially overlapping one passage of the laser beam with a next passage of the laser beam; and
varying a degree of overlap between the first annular zone and the second annular zone.

14. The method of claim 13, wherein the first annular zone has a first degree of overlap which is higher than a second degree of overlap of the second annular zone.

15. A system for cleaning an inner surface of a tire, comprising:
a laser emitter configured to direct a laser beam against the inner surface; and
a control unit configured to:
perform a first cleaning within at least a first annular zone of the inner surface in applying, via at least the laser beam, to the first annular zone a first surface energy density; and
perform a second cleaning within at least a second annular zone of the inner surface in applying, via at least the laser beam, to the second annular zone a second surface energy density that is not zero and that is lower than the first surface energy density,
wherein a different respective surface energy density is applied via at least the laser beam to each of the first annular zone and the second annular zone.

16. The system of claim 15, wherein the second surface energy density is between 35% and 50% of the first surface energy density.

17. The system of claim 15, wherein the first annular zone is arranged both in proximity to side walls of the tire and at a centre of the tire.

18. The system of claim 15, wherein the control unit is further configured to perform an intermediate cleaning within at least a third annular zone of the inner surface in applying, via at least the laser beam, to the third annular zone a third surface energy density that is lower than the first surface energy density and higher than the second surface energy density.

19. The system of claim 18, wherein the third annular zone is interposed between the first annular zone and the second annular zone.

20. The system of claim 18, wherein the third surface energy density is between 60% and 80% of the first surface energy density.

* * * * *